(12) United States Patent
Song et al.

(10) Patent No.: US 9,094,825 B2
(45) Date of Patent: Jul. 28, 2015

(54) METHOD AND APPARATUS FOR PROVIDING SERVICE BASED ON VOICE SESSION AUTHENTICATION

(71) Applicant: Cellco Partnership, Basking Ridge, NJ (US)

(72) Inventors: Lin Song, Newton, MA (US); Yunyan Wang, Wayland, MA (US); Trevor Elkins, Ayer, MA (US); Min Xu, Berkeley Heights, NJ (US); William Andrew Fish, Bedminster, NJ (US); Rangashyam Vijayakrishnan, South Bound Brook, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 13 days.

(21) Appl. No.: 14/057,865

(22) Filed: Oct. 18, 2013

(65) Prior Publication Data

US 2015/0111535 A1  Apr. 23, 2015

(51) Int. Cl.
*G06F 15/16* (2006.01)
*H04W 12/06* (2009.01)
*H04M 1/725* (2006.01)

(52) U.S. Cl.
CPC .......... *H04W 12/06* (2013.01); *H04M 1/72577* (2013.01)

(58) Field of Classification Search
USPC ........................................ 455/410, 411, 412.1
See application file for complete search history.

(56) References Cited

U.S. PATENT DOCUMENTS

2014/0282961 A1 * 9/2014 Dorfman et al. ................... 726/7

* cited by examiner

*Primary Examiner* — Sam Bhattacharya

(57) ABSTRACT

An approach for providing a service over a communication session based on an authentication from a voice session is described. A voice session enhancement platform may determine that a voice session is established among a plurality of devices. The voice session enhancement platform may further retrieve one or more authentication parameters associated with the voice session for the plurality of devices. The voice session enhancement platform may also initiate a service among the plurality of devices, wherein the service is separate from the voice session. Additionally, the voice session enhancement platform may authenticate the plurality of devices for the service based on the one or more authentication parameters.

18 Claims, 11 Drawing Sheets

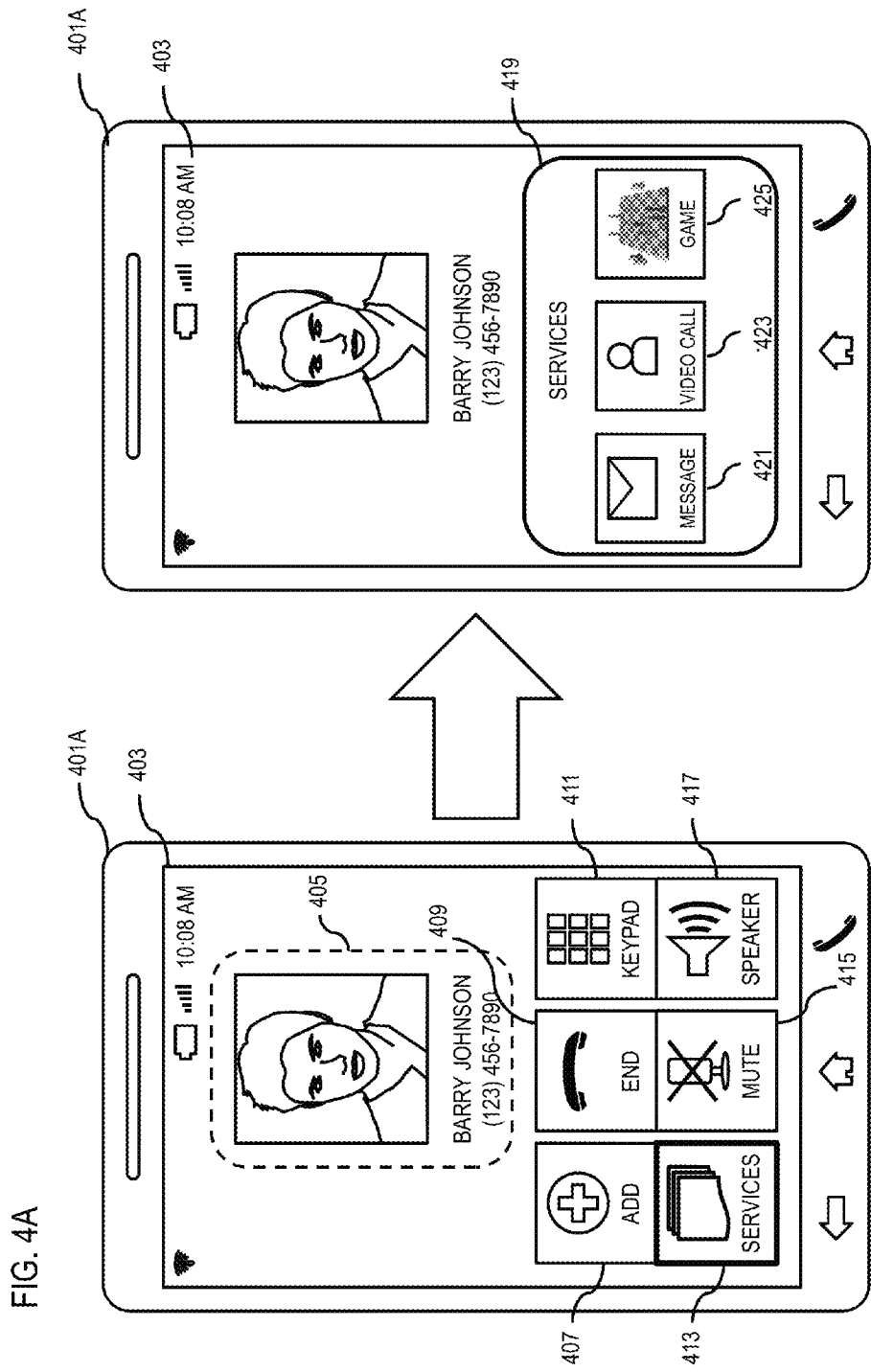

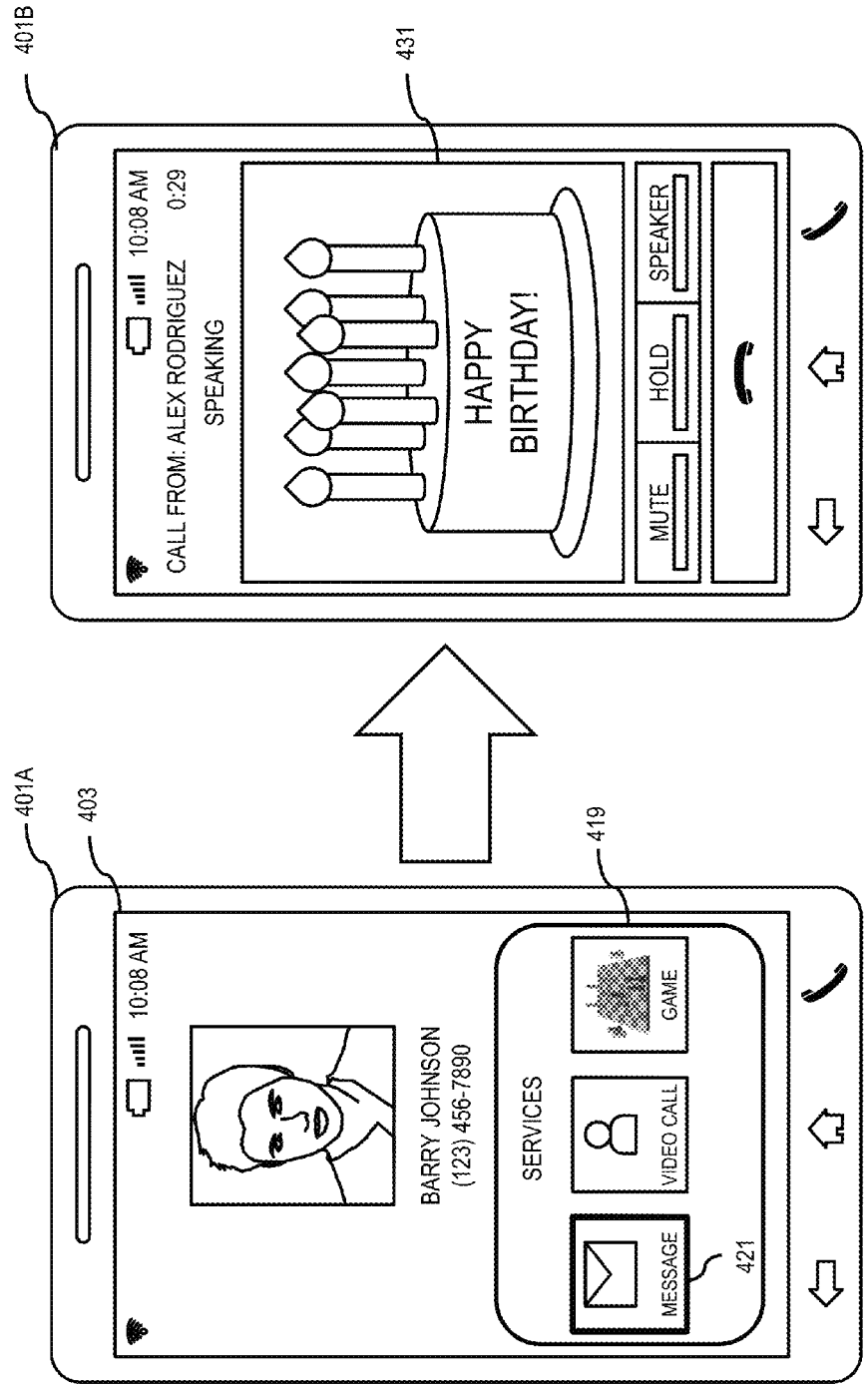

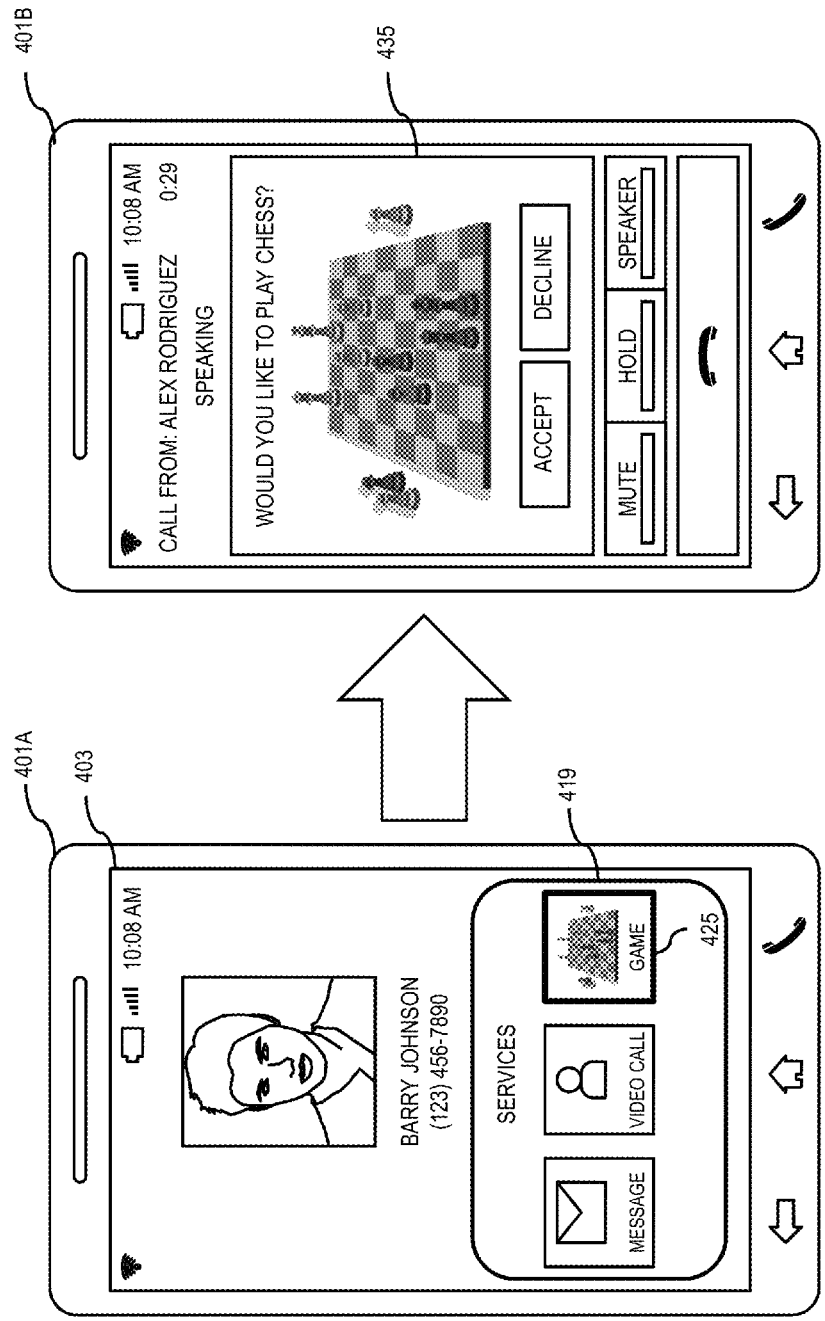

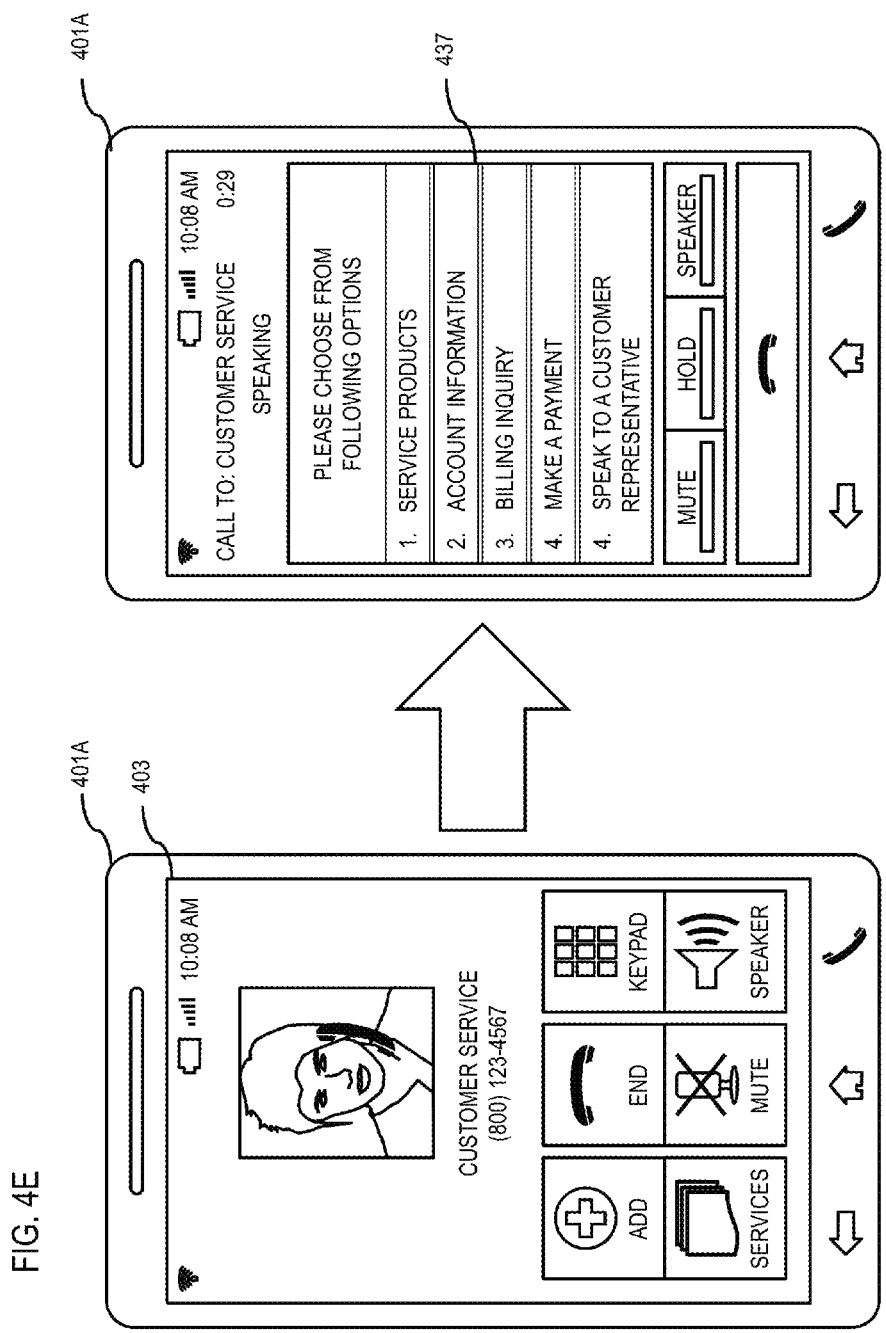

METHOD AND APPARATUS FOR PROVIDING SERVICE BASED ON VOICE SESSION AUTHENTICATION

BACKGROUND INFORMATION

Many network services require an authentication of user devices accessing the services to ensure that the services are accessed by trusted or authorized users. The authentication usually requires users to enter authentication information to log-in to the services. However, users often have different accounts with multiple services and the different accounts are associated with different authentication information. Thus, remembering and entering the different authentication formation for different services are often challenging to the users. Particularly, when a user is on a voice call session with another user, the user may desire to access services immediately without going through an authentication process.

Therefore, there is a need for a system capable of providing a service over a communication session based on an authentication from a voice session.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 4A-4E are diagrams of user interfaces utilized in the processes of FIGS. 3A and 3B, according to various exemplary embodiments;

DESCRIPTION OF THE PREFERRED EMBODIMENT

A method, apparatus, and system for providing a service over a communication session based on an authentication from a voice session, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to providing a service over a communication session based on an authentication from a voice session, it is contemplated that these embodiments have applicability to other systems operated by different entities and to other operations wherein data is retrieved.

Figure 1:
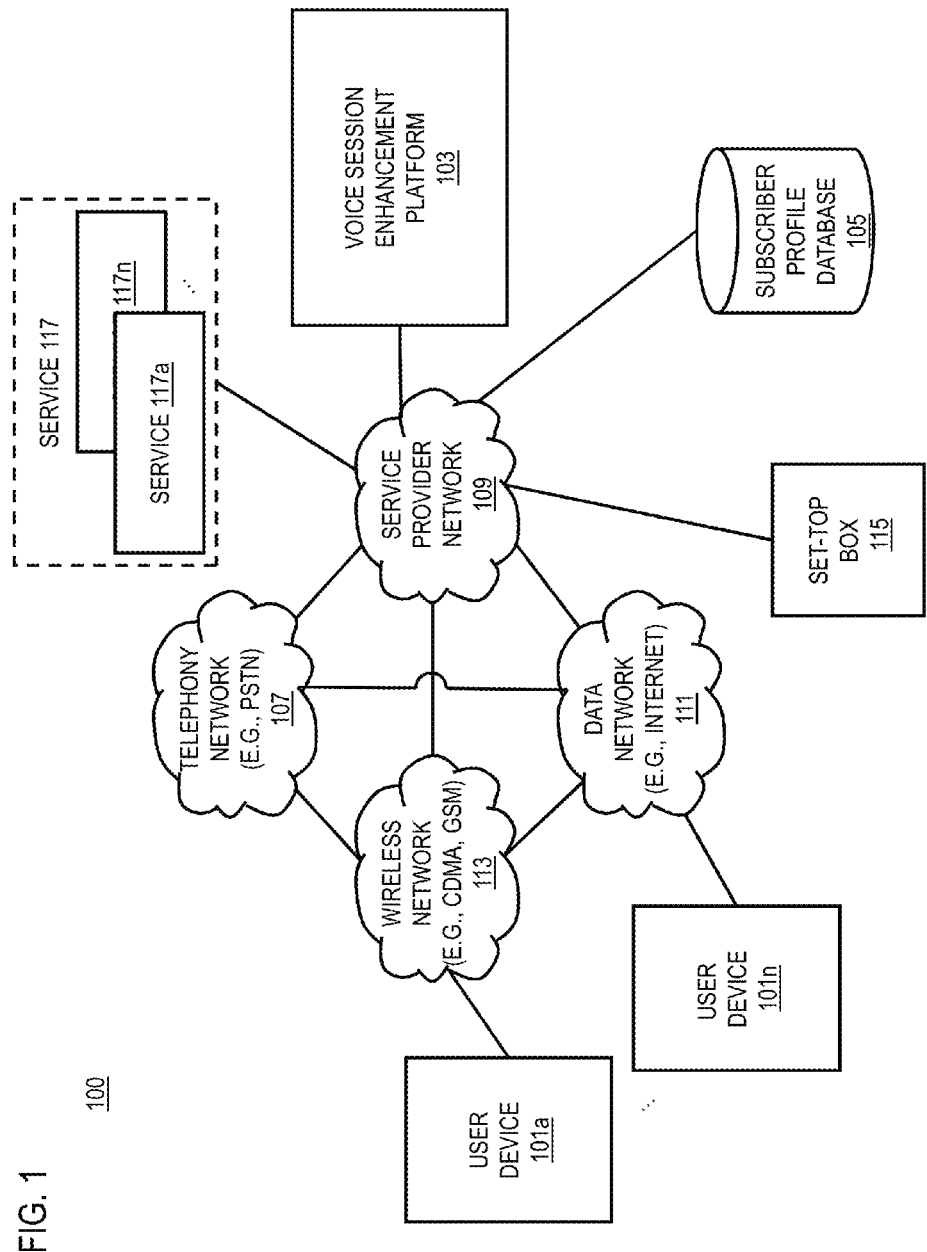
FIG. 1 is a diagram of a system capable of providing a service over a communication session based on an authentication from a voice session, according to an exemplary embodiment.

FIG. 1 is a diagram of a system capable of providing a service over a communication session based on an authentication from a voice session, according to an exemplary embodiment. As noted above, many network services (e.g., game, messaging, social network, video call, etc.) increasingly require an authentication of a user when the user desires to access the services with a user device (e.g., smart phone, mobile phone, home phone etc.) to ensure the security and privacy of the users and the service providers. However, remembering and entering authentication information (e.g., user identification, password, etc.) to access different services are often challenging because the different services are associated with different accounts and different authentication information. For example, when a user desires to play a game with another user, each of the user and the another user have to create or own an account with the game service and have to log-in to the service with his or her authentication information generated during the account set up. Further, the user may have created another account with messaging service with different authentication information. As the number of different accounts associated with different services adds up, the user is often more challenged to remember all the authentication information. Especially, when the users are on a voice call session, the users often desire to access and share services among the users. For example, a user who is on a call with another user may desires to share a picture with the other user instantly, without going through cumbersome authentication process of entering authentication information to initiate a messaging service.

To address this problem, a system 100 of FIG. 1 introduces the capability to provide a service over a communication session based on an authentication from a voice session. In one embodiment, the system 100 may include a voice session enhancement platform 103 implemented as, for example, part of a service provider network 109 for providing a service over a communication session based on an authentication from a voice session among user devices 101a-101n (collectively, user device 101), where subscriber information data for the authentication is retrieved from databases 105a-105n (collectively, database 105). However, in alternative embodiments, the user device 101, the voice session enhancement platform 103, and the subscriber profile database 105 may be implemented as any part of the system 100. For example, the user device 101 may be implemented as part of the telephony network 107, the service provider network 109, the data network 111, or the wireless network 113. The subscriber profile database 105 may also be implemented as part of the telephony network 107, the service provider network 109, the data network 111, or the wireless network 113. The service provider network 109 can interact with one or more of other networks (e.g., telephony network 107, data network 111, and the wireless network 113). Also, it is noted that a set-top box 115 may be implemented as part of the service provider network 109 and the service 117a-117n (collectively, service 117) may be provided over the service provider network 109.

In certain embodiments, the user device 101 may include any type of computing device comprising a mobile handset, mobile phone, mobile station, desktop computer, tablet computer, laptop computer, netbook computer, personal digital assistants (PDAs), smart phone, communication receiver, home phone, media receiver, wearable computer, a set-top box, etc. It is also contemplated that the user device 101 may support any type of user interface for supporting the present-ment or exchange of data. In addition, the user device 101 may facilitate various input means for receiving and generating information, including touch screen capability, keyboard and keypad data entry, voice-based input mechanisms, and the like. Any known and future implementations of the user device 101 are applicable. It is noted that, in certain embodiments, the user device 101 may be configured to transmit information using a variety of technologies, including near field communication (NFC), radio-frequency identification (RFID), WiFi, Bluetooth®, infrared, etc. Also, connectivity may be provided via a wired or wireless local area network (LAN).

In certain embodiments, the voice session enhancement platform 103 may determine that a voice session is established among a plurality of the user device 101 through the service provider network 109. The voice session enhancement platform 103 then may retrieve one or more authentication parameters from the plurality of the user device 101. The one or more authentication parameters may be determined from the subscriber identification information stored in the plurality of the user device 101. The plurality of the user device 101 may be authenticated by comparing the one or more authentication parameters against subscriber profile data stored in stored in the database 105. The subscriber profile data may be associated with the authentication parameters of the plurality of the user device 101. Then, the voice session enhancement platform 103 may establish a communication session over the networks 107-111, separate from the voice session, based on the one or more authentication parameters and provide services over the communication session. The communication session may be in parallel to the voice session and the services may be continued over the communication session after a termination of the voice session.

In certain embodiments, the subscriber profile database 105 may be a structured collection of data. The database 105 may be associated with database management systems (DBMS) (e.g., Oracle, FoxPro, IBM DB2, Linter, Microsoft Access, Microsoft SQL Server, MySQL, PostgreSQL, SQLite, etc.). The subscriber profile database 105 may include various databases of different types comprising an active database, cloud database, distributed database, document-oriented database, end-user database, operational database, parallel database, graph database, knowledge database, unstructured-data database, etc.

The subscriber profile database 105 may contain data about the user device 101 and users subscribed to the communication service provider of the service provider network 109 (e.g. subscribers). The subscriber profile database 105 may contain subscribers' names, addresses, phone numbers, registered devices, dates of birth, social security numbers, current service plans, purchase histories, etc. Further, the subscriber profile database 105 may contain authentication parameters associated with the user device 101 and the subscribers, including a phone number, a subscriber identifier, a device identifier, a network identifier, an authentication key, a user identifier, etc.

For illustrative purposes, the networks 107-113 may be any suitable wireline and/or wireless network, and be managed by one or more service providers. For example, telephony network 107 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, the networks 107-113 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of system 100. In this manner, the networks 107-113 may embody or include portions of a signaling system 7 (SS7) network, or other suitable infrastructure to support control and signaling functions. Also, as noted above, the set-top box 115 may be implemented as part of the service provider network 109 and the service 117a-117n (collectively, service 117) may be provided over the service provider network 109.

The set-top box 115 may include a device that connects to a television, media player, etc., and an external source of signal (e.g., media service provider (not shown)), turning the signal into content which is then displayed on the television screen or other display device (e.g., game console, cable TV converter, IPTV receiver, etc.). The set-top boxes process signals for presenting audio-visual content (e.g., broadcast television programs, Video On Demand (VOD) programs, pay-per-view programs, Internet Protocol television (IPTV) feeds, DVD related content, etc.), pre-recorded media content, data communication services content (e.g., commercials, advertisements, videos, movies, songs, images, sounds, etc.), Internet services content (streamed audio, video, or image media), and/or any other equivalent media form. As noted above, the user device 101 may include the set-top box 115. In one embodiment, the set-top box may initiate a voice call with the user device 101.

In certain embodiments, the service 117 may include any type of network services including messaging, game, social network, online banking, video call, contents sharing, interactive voice response (IVR), etc. The service 117 may also include computing device for providing the services comprising a mobile computer, desktop computer, tablet computer, laptop computer, netbook computer, communication receiver, etc. In one embodiment, the service 117 may receive a request for a service from the user device 101 on a voice session, and the service 117 may receive authentication information of the user device 101 from the voice session enhancement platform 103. Upon receiving the authentication information, the service 117 may provide the service to the user device 101 by establishing another communication session with the user device 101. Further, the service 117 may provide the user device 101 software, application, or user interfaces for user interaction necessary for utilizing the service. For an example of the IVR service, the IVR service may initially establish a voice call session from the user device 101, and the voice session enhancement platform 103 may provide the IVR service with the authentication information of the user device 101 from the voice call session. Based on the authentication information received from the voice session enhancement platform 103, the IVR service may provide the visually aiding user interface to the user device 101 through another communication session with the user device 101. The user interface may be used for interacting with the IVR service, and the user interaction (e.g., touch, pressing button, selecting option, etc.) may be converted to service commands and transmitted to the service 117. The service 117 may present further information on the user interface based on the service commands.

Figure 2:
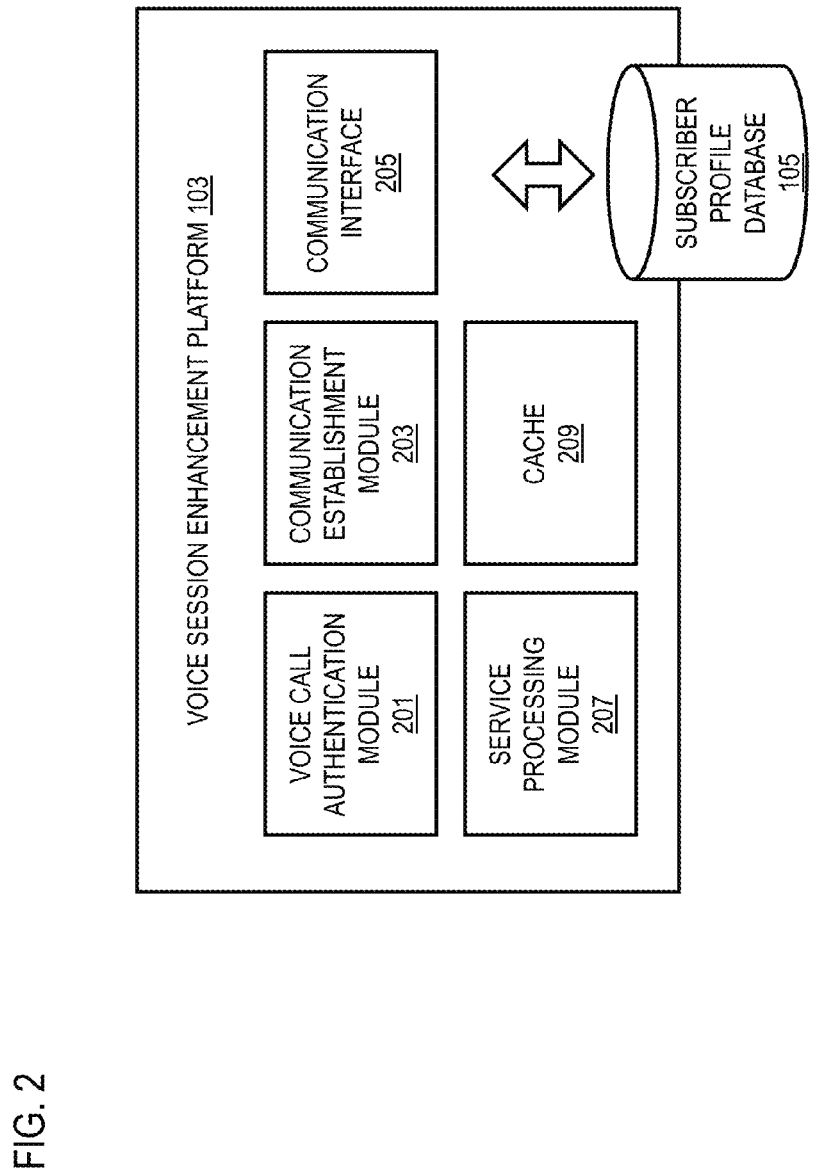
FIG. 2 is a diagram of a voice session enhancement platform utilized in the system of FIG. 1, according to an exemplary embodiment.

FIG. 2 is a diagram of a voice session enhancement platform 103 utilized in the system of FIG. 1, according to an exemplary embodiment. The voice session enhancement platform 103 may include a voice call authentication module 201, a communication establishment module 203, a communication interface 205, a service processing module 207, and a cache 209. In certain embodiments, the voice session enhancement platform 103 may include the subscriber profile database 105.

In one embodiment, the voice call authentication module 201 may be configured to determine an authentication of the user device 101 for an establishment a voice call session. For example, the authentication module 201 may receive a request from the user device 101a to establish a voice session with the with the user device 101b. The voice call authentication module 201 may receive authentication information (e.g., authentication parameters, subscriber parameters, etc.) from the user device 101a and determine the authentication of the user device 101a based on the authentication information. Then the voice call authentication module 201 may determine the user device 101b based on the request which may include profile information (e.g., phone number, subscriber identifier, etc.) about the user device 101b. Upon determining the user device 101b, the voice call authentication module 201 may request authentication information from the user device 101b and may determine authentication of the user device 101b based on the authentication information. The authentication of the user devices 101 may be determined by comparing the authentication information received from the user device 101 against other authentication information retrieved from the subscriber profile database 105. The authentication determined by the voice call authentication module 201 may be utilized by the communication module in establishing the voice call session or another communication session. Further, the authentication determined by the voice call authentication module 201 may be utilized in accessing the service 117 and creating permanent or temporary accounts for the service 117. In one embodiment, the authentication determined by the voice call authentication module 201 may be stored in the cache 209 for fast access by the communication establishment module 203.

In one embodiment, the communication establishment module 203 may be configured to establish a communication session among the user device 101 based on the authentication of the user device 101 determined by the voice call authentication module 201. For example, the communication establishment module 203 may receive a request from the service 117 or the user device 101 to establish a communication session between the user device 101a and 101b which are on a voice call session. Upon receiving the request, the communication establishment module 203 may retrieve the authentication determined by the voice call authentication module 201 from the cache 209 and establish the communication session through the communication interface 205 based on the authentication determined by the voice call authentication module 201. The communication establishment module 203 may not further request the authentication information from the user device 101 or further determine the authentication of the authentication determined by the voice call authentication module 201. In certain embodiments, the voice call session may be established via a telecommunication network (e.g., telephony network 107, wireless network 113, etc.) and separate communication session may be established via a data network (e.g., data network 111, service provider network 109, etc.).

In one embodiment, the communication interface 205 may be configured to communicate with other components of the system 100 (e.g., user device 101, subscriber profile database 105, set-top box 115, and service 117) via the networks 107-113. The communication interface 205 may include multiple means of communication. For example, the communication interface 205 may be able to communicate via wired or wireless links, over short message service (SMS), multimedia messaging service (MMS), Internet protocol (IP), instant messaging, voice sessions (e.g., via a phone network), email, NFC, QR Codes, or other types of communication.

In one embodiment, the service processing module 207 may be configured to process service data received from the service 117 to the user device 101 over the communication session established by the communication establishment module 203. The service processing module 207 may receive a request to initiate a service from the user device 101 on a voice call session. The service processing module 207 may retrieve the authentication determined by the voice call authentication module 201 from the subscriber profile database 105 or determine other profile information based on the authentication. The authentication or the other profile information may be provided to the service 117 for an access to the service 117. In one embodiment, the service processing module 207 may generated a permanent or temporary account associated with the service 117 based on the authentication or other profile information. The permanent or temporary account may be required by the service 117 to access the service 117. In certain embodiment, the service processing module 207 may receive service data from the service and provide the service data to the user device 101 over the communication session among the device 101. The service processing module 207 may cause an installation of software or application in the user device 101. Further, the service processing module 207 may cause a rendering of user interfaces provided by the service 117 on the user device 101. In addition, the service processing module 207 may also monitor a request to discontinue the service or switch the service to another service from the user device 101 and causes a discontinuation or switch of the service provided on the user device 101. The service processing module 207 may request the service 117 to discontinue the service or may request the communication establishment module 203 to cease the communication session.

In one embodiment, the cache 209 may include a component that transparently stores data so that future request for that data can be served faster. The data stored within the cache may be values that have been computed earlier (e.g., authentication determined by the voice call authentication module 201) or duplicate of original values that is stored in other components (e.g., subscriber profile database 105). If requested data is contained in the cache 209, the request can be served by simply reading the cache. Otherwise, the data may need to be recomputed or fetched from its original storage location (e.g., authentication determined by the voice call authentication module 201).

In one embodiment, the subscriber profile database 105 may be designed to store subscriber data associated with the user device 101 and the users (or subscribers) subscribed to the service provider (e.g., telecommunication service carrier) of the service provider network 109. As described above, the subscriber profile database may contain subscribers' names, addresses, phone numbers, registered devices, dates of birth, social security numbers, current service plans, purchase histories, etc. Further, the subscriber profile database may contain authentication parameters associated with each user device 101 and subscriber, including a phone number, a subscriber identifier, a device identifier, a network identifier, an authentication key, a user identifier, etc. The subscriber profile database 105 may be part of the database 105 or the voice session enhancement platform 103. The subscriber profile database 105 may be accessible through the service provider network 109 or internally within the voice session enhancement platform 103.

Figure 3A:
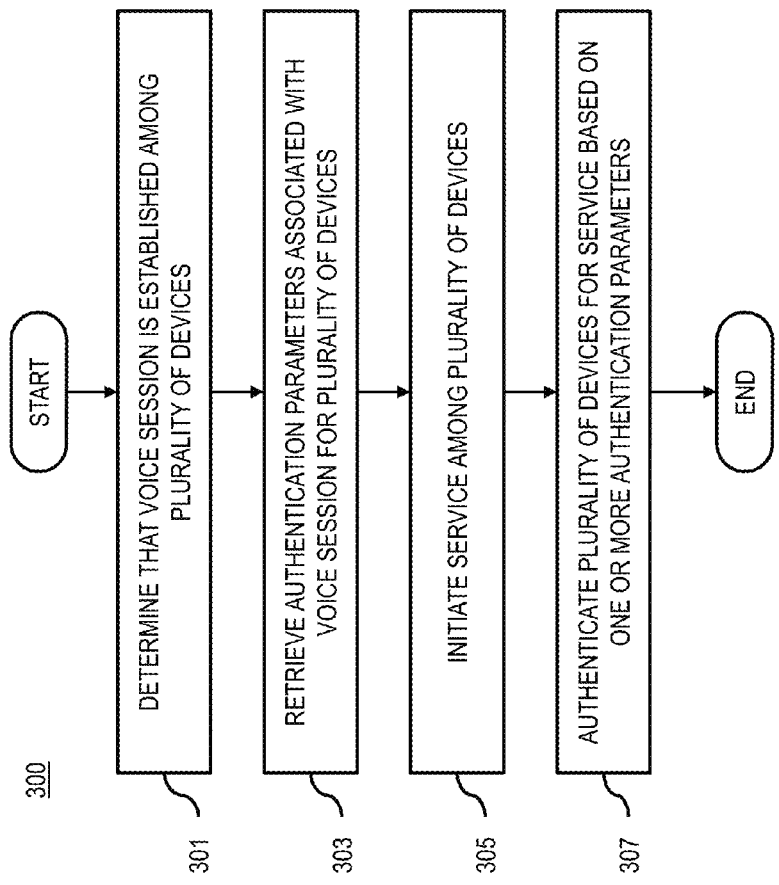
FIGS. 3A and 3B are flowcharts of processes for providing a service over a communication session based on an authentication from a voice session, according to various exemplary embodiments.
Figure 3B:
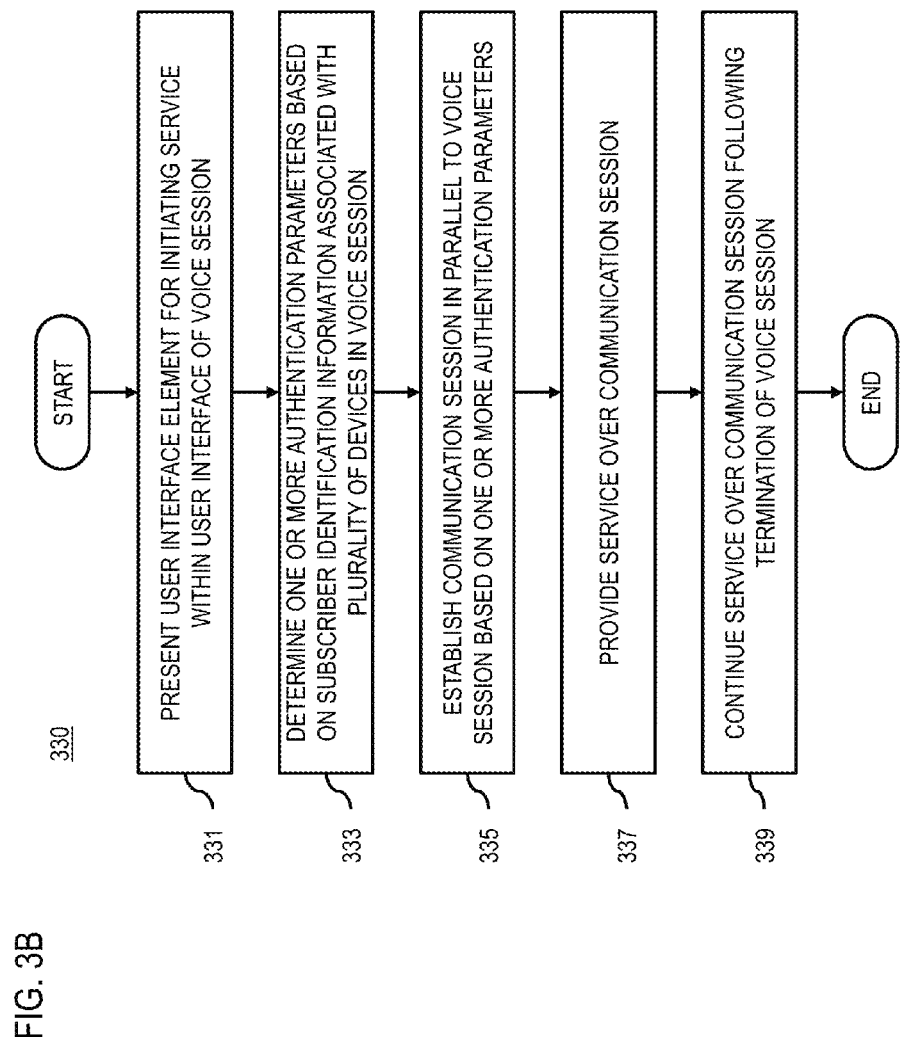

FIGS. 3A and 3B are flowcharts of processes 300 and 330 for providing a service over a communication session based on an authentication from a voice session, according to various exemplary embodiments. For illustrative purposes, the processes 300 and 330 are described with reference to FIG. 1. The steps of the processes 300 and 330 may be performed in any suitable order, as well as combined or separated in any suitable manner.

In particular, FIG. 3A is illustrated to describe the process 300 of providing a service over a communication session based on an authentication from a voice session from the perspective of the voice session enhancement platform 103.

In one embodiment, the voice session enhancement platform 103 may determine that a voice session is established among a plurality of devices (step 301). The voice call authentication module 201 of the authenticated-communication platform 103 may process the data associated with the voice session to determine that the voice session is established among a plurality of the device 101. For example, the user device 101a may establish a voice session with the user device 101b via the networks 107-113. The data associated with the establishment of the voice session (e.g., voice session log, connection status, etc.) may be stored with the service provider of the service provider network 109. Such data may be retrieved and processed by the voice session enhancement platform 103 to determine that the voice session is established between the user device 101a and the user device 101b.

In one embodiment, the voice session enhancement platform 103 may retrieve one or more authentication parameters associated with the voice session for the plurality of devices (step 303). Upon determining the establishment of the voice session among the plurality of the user device 101 (step 301), the voice session enhancement platform 103 may retrieve the authentication parameters associated with the plurality of the user device 101 from the plurality of the user device 101 and from the subscriber profile database 105 through the communication interface 205. For example, the authentication parameters may be transmitted from the user device 101a to the voice session enhancement platform 103 when the request to establish the voice session with the user device 101b is transmitted. The voice session enhancement platform 103 may also actively request the authentication parameters from the user device 101a and 101b. Another set of the authentication parameters may be retrieved from the subscriber profile database 105 of the subscriber profile database 105 based on identification data associated with the user device 101a and 101b. As noted above, the authentication parameters may include a phone number, a subscriber identifier, a device identifier, a network identifier, an authentication key, a user identifier, etc.

In one embodiment, the voice session enhancement platform 103 may initiate a service among the plurality of devices, wherein the service is separate from the voice session (step 305). The voice session enhancement platform 103 may initiate a service other than the voice service from the voice session (e.g., service from third party service provider or other service from the service provider of the service provider network 109) among the plurality of the user device 101 on the voice session. For example, the user device 101a on the voice session may request a service (e.g., messaging, video call, game, interactive voice response) provided by a third party service provider for the user devices 101a and 101b. The voice session enhancement platform 103 may process the request to initiate the service. In one embodiment, the required software or application for initiating the service may be already installed in the user devices 101 or may be downloaded from the service provider (e.g., third party service provider or service provider of the service provider network 109) prior to the initiation of the service. Further, the service may be provided over other communication session separate from the voice session.

In one embodiment, the voice session enhancement platform 103 may authenticate the plurality of devices for the service based on the one or more authentication parameters (step 307). When the voice session enhancement platform 103 initiates the service among the plurality of the user device 101 of the voice session (step 305), the voice session enhancement platform 103 may determine authentication of the plurality of the user device 101 for the service based on the authentication parameters retrieved in step 303. For example, the authentication module 201 of the voice session enhancement platform 103 may compare the set of authentication parameters retrieved from the user devices 101a and 101b with the other set of authentication parameters (associated with the user devices 101a and 101b) retrieved from the subscriber profile database 105 of the database 105. If the retrieved sets of the authentication parameters match, the user devices 101a and 101b are determined to be authenticated. Further, the authentication of the plurality of user device 101 from the voice session may be used as an authentication to establish another communication session or to access the services. In that way, the authentication process required by the services may be omitted and the services can be provided immediately.

FIG. 3B is illustrated to describe the process 330 of providing a service over a communication session based on an authentication from a voice session from the perspective of the voice session enhancement platform 103.

In one embodiment, the voice session enhancement platform 103 may present a user interface element for initiating the service within a user interface of the voice session (step 331). For example, when the voice session is established between the user device 101a and the user device 101b, the user interface of the voice session may be presented the user device 101a and the user device 101b. Further, the user interface element for initiating a service (e.g., service start button or icon) may be presented within the user interface of the voice session. The user interface element may include a button or icon (e.g., services button 413) for initiating available services as shown in FIGS. 4A-4E. In one embodiment, the user interface of the voice session may be provided by the service provider of the voice session or the user device 101. Examples of the user interface for the voice session (e.g., user interface 403) are shown in FIGS. 4A-4E.

In one embodiment, the voice session enhancement platform 103 may determine the one or more authentication parameters based on subscriber identification information associated with the plurality of devices in the voice session (step 333). For example, when an input for initiating a service is received, the voice session enhancement platform 103 may determine the authentication parameters associated with the user device 101, wherein the authentication parameters are later used as a basis for initiating a service. The authentication parameters may be part of the subscriber identification information stored in the user device 101 on the voice session. As presented with respect to step 303 above, the authentication parameters may be retrieved from the user device 101 and the database 105. In one embodiment, the authentication parameters or the subscriber identification information retrieved from the user device 101 may be stored in a subscriber identification module (SIM) or SIM card installed or inserted in the user device 101. The SIM card may contain its unique serial number (ICCID), international mobile subscriber identity (IMSI), security authentication and ciphering information, temporary information related to the local network, a list of the services the user has access to and passwords (e.g., personal identification number (PIN) and unblocking code (PUK)), etc.

In one embodiment, the voice session enhancement platform 103 may establish a communication session in parallel to the voice session based on the one or more authentication parameters (step 335). For example, when a request to initiate a service or to establish another communication session is received, the voice session enhancement platform 103 may establish another communication session separate from the voice session. In that way, the service may be sustained even if the voice session may end. The communication session may be established over any or any combination of the networks 107-113. In one embodiment, the communication session may be established over the data network 111 (e.g. Internet) while the voice session is established over the wireless network 113 (e.g., CDMA, GSM). In other embodiment, the communication session may be established on a same network as the voice session, over a channel different from the channel of the voice session. The communication session may be established based on the authentication parameters determined (step 333). In that way, additional authentication to establish the communication session may not be necessary.

In one embodiment, the voice session enhancement platform 103 may provide the service over the communication session (step 337). The service may include a messaging service, a game service, a video call service, an interactive voice response service, etc. For example, the service may be provided over the communication session after the establishment of the communication session (step 335). The voice session enhancement platform 103 may send the authentication information (e.g., information that the user device 101 is already authenticated or actual authentication parameters) to the service provider of the service. The service provider may provide service data directly to the user device 101 through the communication session without requiring the user device 101 an authentication process. In one embodiment, the service data may be sent to the voice session enhancement platform 103 and the voice session enhancement platform 103 may provide the service or service data to the user device through the communication session. When the service is provided, the service software or an application (already installed in the user device) may be activated and a user interface for the service may be presented on the user device 101. If the software or application is not already installed, they may be downloaded through the communication session before the service is provided.

In one embodiment, the voice session enhancement platform 103 may continue the service over the communication session following a termination of the voice session (step 339). As described above, because the communication session is established in parallel to the voice session (step 335), the service may be continuously provided over the communication session even if the voice session is terminated. Also, since the service is already started based on the authentication from the voice session, additional authentication of the user device 101 may not be required after the termination of the voice session. In addition, the user device 101a may establish another voice session with a user device 101c following the termination of the voice session with the user device 101b while maintaining the service over the communication session with the user device 101b. Further, if the user device 101c is authenticated for the second another voice session with the user device 101a, the user device 101c may be added to the communication session between the user devices 101a and 101b and receive the same service as the user devices 101a and 101b over the communication session.

In certain embodiments, the voice session enhancement platform 103 may determine one or more temporary accounts, one or more permanent accounts, or a combination thereof associated with the plurality of devices based on the one or more authentication parameters. The voice session enhancement platform 103 may generate a temporary or permanent accounts associated with the user device 101 for a service that requires the temporary or permanent account. For example, a game service may require an account for each user and the account information (e.g., log-in ID and password) may be used as an authentication to access the game service. The voice session enhancement platform 103 may generate a temporary or permanent accounts based on the authentication parameters of the user device 101 on the voice session. The user may not be required to manually create an account for the service or log-in to the service. In one embodiment, the temporary or permanent accounts associated with the user device 101 may be already created and the accounts information may be stored in a database (e.g., subscriber database of database 105) associated with the voice session enhancement platform 103. The voice session enhancement platform 103 may retrieve the accounts information from the database based on the authentication parameters of the user device 101 on the voice session.

Further, the voice session enhancement platform 103 may initiate the service based on the one or more temporary accounts, the one or more permanent accounts, or a combination thereof. The voice session enhancement platform 103 may initiate the service on the user device 101 by automatically logging in the user device 101 with the temporary or permanent account information determined above. The user may not be required to manually enter account information to log in to the service. For example, a game service may be automatically accessed with the account information generated or retrieved based on the authentication parameters.

In certain embodiments, the plurality of devices of the voice session may include a service device associated with a service provider. The voice session enhancement platform 103 may present a service user interface for interacting with the service. An example of the service user interface is described below with respect to FIG. 4E. Further, the service user interface may convert a user interaction into one or more service commands for transmission to the service device over the voice session. For example, the service may include an interactive voice response (IVR) service (service 117). The IVR service device may present the service user interface for interacting with the service in the user device 101. The service user interface may visually aid the IVR service. The user inputs on a user interface element (e.g., button or icon) of the service user interface (e.g., touch input, selection input, etc.) may be converted to a service command and transmitted to the IVR service device. The converted service command may be transmitted over the voice session or a separate communication channel which may be established based on the authentication from the voice session. FIGS. 4A-4E are diagrams of user interfaces utilized in the processes of FIGS. 3A and 3B, according to various exemplary embodiments.

FIG. 4A is a diagram of a user interface for initiating a service over a communication session established based on an authentication from a voice session, according to an exemplary embodiment. A user device 401A may render a voice session user interface 403. The voice session user interface 403 may include callee (or called party)'s profile information 405, including a picture, name, phone number, etc. The voice session user interface 403 may also include user interface elements, including as an add button 407 for adding (or inviting) another callee to the voice session, an end button 409 for ending the voice session, a keypad button 411 for presenting a virtual keypad for a user inputs, a services button 413 for presenting available services 419, a mute button for muting a microphone of the user device 401, and a speaker phone button for enabling speaker phone function. The available services 419 may be presented when the services button 413 is selected. The available services 419 may present available services including messaging service button 421, video call service button 423, game service button 425, etc. The services may be initiated by selecting one of the available services 419.

FIG. 4B is a diagram of a user interface for a messaging service provided over a communication session established based on an authentication from a voice session, according to an exemplary embodiment. When the messaging service button 421 of the available services 419 on the user device 401A (caller) is selected, a communication session for a messaging service between the user devices 401A and 401B (callee) may be established based on authentication of the user devices 401A and 401B from the voice session. The communication session may be established by the communication establishment module 203 based on the authentication of the user device 401A and 401B determined by the voice call authentication module 201. The service processing module 207 may process service data received from the messaging service (service 117). The service processing module 207 may cause a presentation of a messaging service user interface (not shown) on the user device 401A. The messaging service user interface may present contents (e.g., picture, video, audio, text, etc.) to be included in a message. The message may be sent to the other user device 401B through the established communication session. The message may be received by the other user device 401B through the communication session, and the service processing module 207 may cause a presentation of a messaging service user interface 431 on the other user device 401B. The received message may be presented in the messaging service user interface 431. The messaging service may be provided by a third-party messaging service provider through the service processing module 207. The user devices 401A and 401B may initiate the messaging service without going through additional authentication (e.g., log-in process) by the third-party messaging service provider based on the authentication of the user device 401A and 401B determined by the voice call authentication module 201.

Figure 4C:
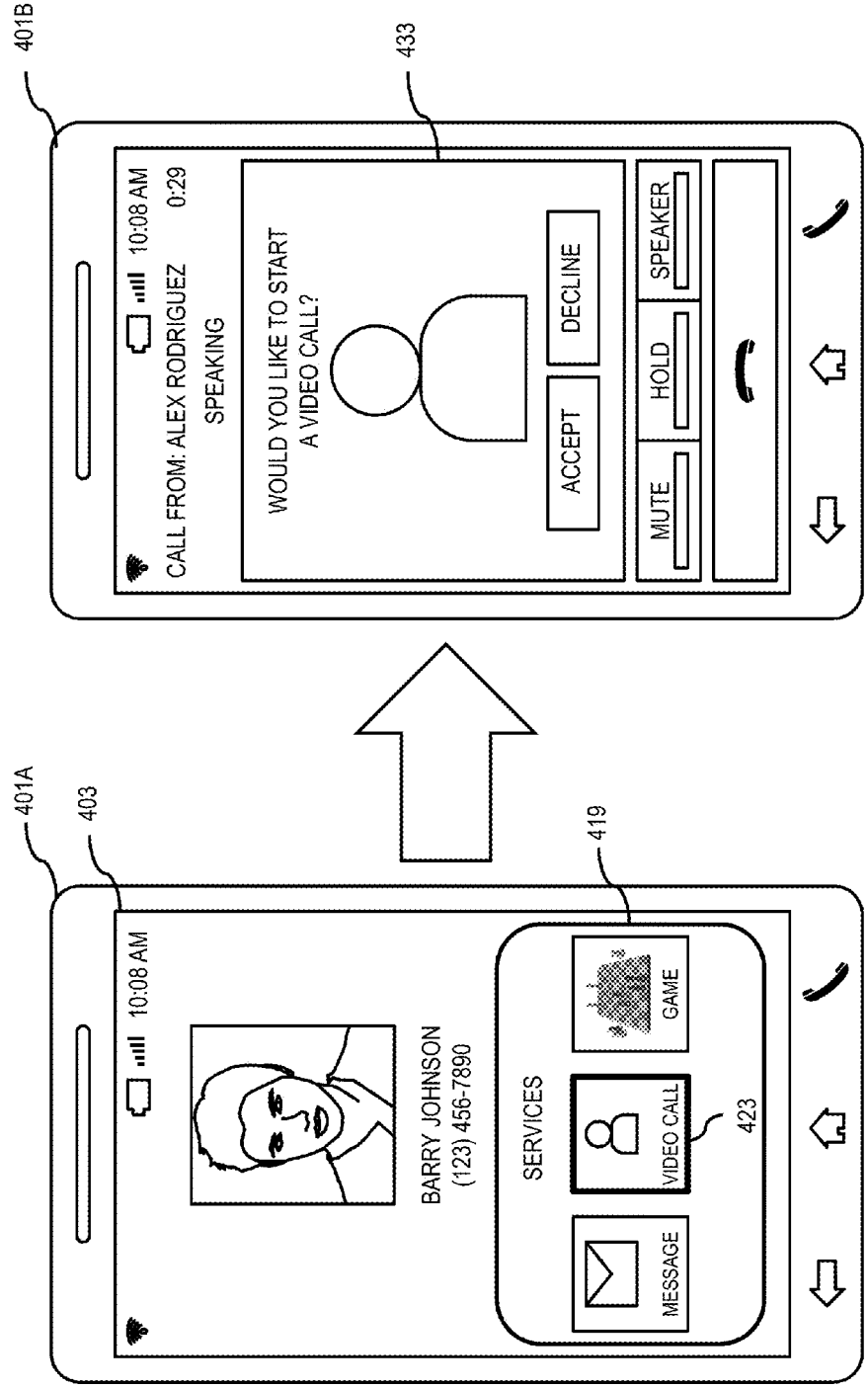

FIG. 4C is a diagram of a user interface for a video call service provided over a communication session established based on an authentication from a voice session, according to an exemplary embodiment. When the video call service button 423 of the available services 419 on the user device 401A (caller) is selected, a communication session for a video call service between the user devices 401A and 401B (callee) may be established based on authentication of the user devices 401A and 401B from the voice session. The communication session may be established by the communication establishment module 203 based on the authentication of the user device 401A and 401B determined by the voice call authentication module 201. The service processing module 207 may process service data received from the video call service (service 117). The service processing module 207 may cause a presentation of a video call user interface (not shown) on the user device 401A. The video call user interface may present a start-video-call button to request a video call with the other user device 401B. A request (or invitation message) to initiate a video call may be sent to the other user device 401B through the established communication session. The request may be received by the other user device 401B through the communication session, and the service processing module 207 may cause a presentation of a video call service user interface 433 on the other user device 401B. The request may be presented in the video call service user interface 433. The received request may be accepted or rejected by responding to the invitation message in the request. In one embodiment, the video call service may be provided by a third-party video call service provider through the service processing module 207. The user devices 401A and 401B may initiate the video call service without going through additional authentication (e.g., log-in process) by the third-party video call service provider based on the authentication of the user device 401A and 401B determined by the voice call authentication module 201.

FIG. 4D is a diagram of a user interface for a game service provided over a communication session established based on an authentication from a voice session, according to an exemplary embodiment. When the game service button 425 of the available services 419 on the user device 401A (caller) is selected, a communication session for a game service between the user devices 401A and 401B (callee) may be established based on authentication of the user devices 401A and 401B from the voice session. The communication session may be established by the communication establishment module 203 based on the authentication of the user device 401A and 401B determined by the voice call authentication module 201. The service processing module 207 may process service data received from the game service (service 117). The service processing module 207 may cause a presentation of a game user interface (not shown) on the user device 401A. The game user interface may present a start game button to request playing a game with the other user device 401B. A request (or invitation message) to play a game may be sent to the other user device 401B through the established communication session. The request may be received by the other user device 401B through the communication session, and the service processing module 207 may cause a presentation of a game service user interface 435 on the other user device 401B. The received request may be presented in the game service user interface 435. The request may be accepted or rejected by responding to the invitation message in the request. In one embodiment, the game service may be provided by a third-party game service provider through the service processing module 207. The user devices 401A and 401B may initiate the game service without going through additional authentication (e.g., log-in process) by the third-party game service provider based on the authentication of the user device 401A and 401B determined by the voice call authentication module 201.

FIG. 4E is a diagram of a user interface for an interactive voice response (IVR) service provided over a communication session established based on an authentication from a voice session, according to an exemplary embodiment. The user device 401A (caller) may establish a voice call session with an IVR service (callee) based on the authentication of the user device 401A and 401B determined by the voice call authentication module 201. The service processing module 207 may process service data received from the IVR service. When the user device 401A establishes the voice session with the IVR service (service 117), the service processing module 207 may cause a presentation of an IVR service user interface 437 on the user device 401A. The IVR service user interface 437 may be presented automatically when the voice session is established or when a visual aid of the IVR service is specifically requested by the user device 401A. A communication session of the IVR service may be established by the communication establishment module 203 based on authentication of the user device 401A determined by the voice call authentication module 201. The IVR service user interface 437 may present selectable options that may visually aid the voice session. Selecting one of the options on the IVR service user interface 437 may cause the IVR service user interface 437 to present next options or selected information. As noted above The IVR service user interface 437 may be used for interacting with the IVR service, and the user interaction (e.g., touch, pressing button, selecting option, etc.) on the IVR service user interface 437 may be converted to service commands and transmitted to the IVR service. The IVR service may present further information on the user interface based on the service commands.

The processes described herein for providing a service over a communication session based on an authentication from a voice session may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
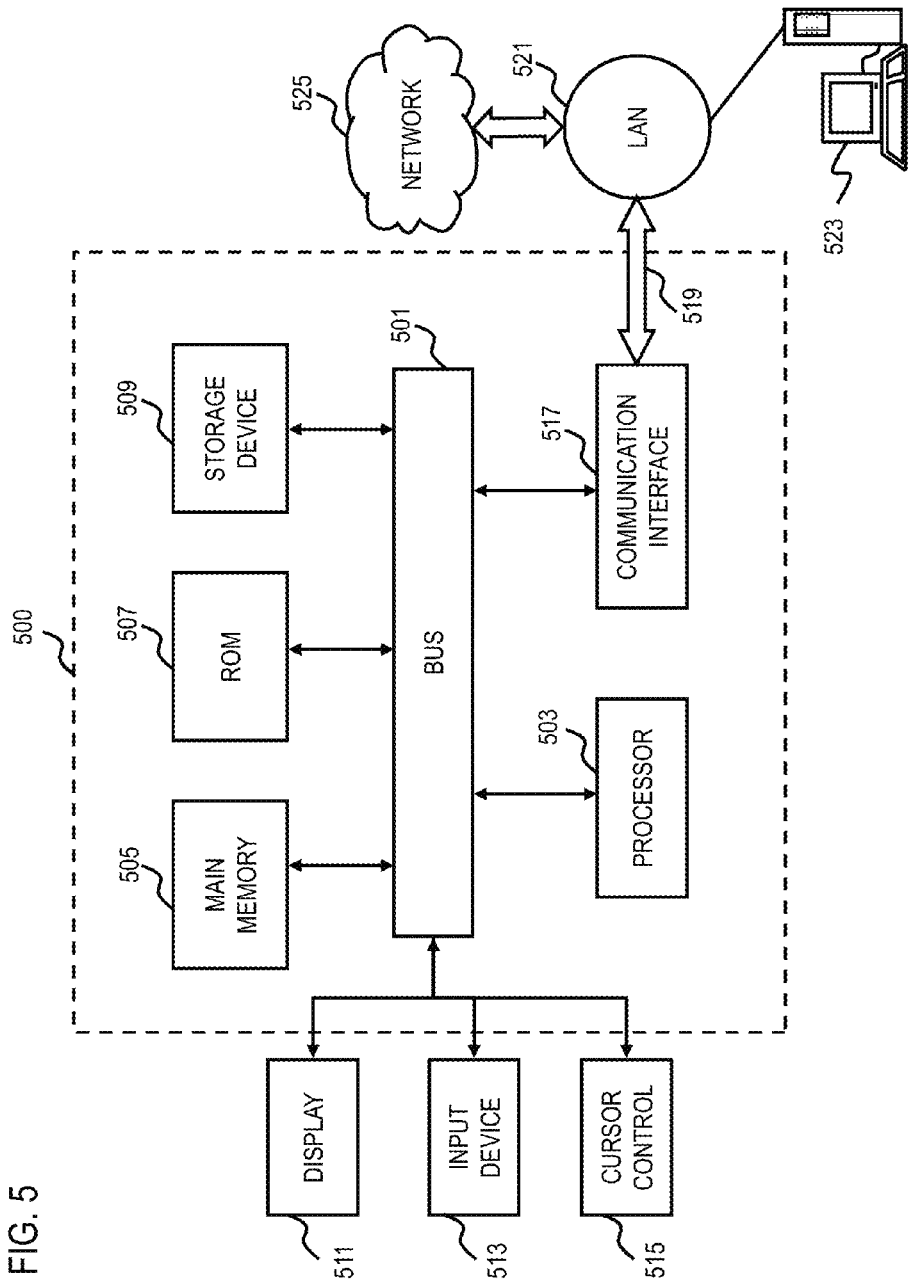
FIG. 5 is a diagram of a computer system that can be used to implement various exemplary embodiments.

FIG. 5 is a diagram of a computer system that can be used to implement various exemplary embodiments. FIG. 5 illustrates computing hardware (e.g., computer system 500) upon which an embodiment according to the invention can be implemented. The computer system 500 includes a bus 501 or other communication mechanism for communicating information and a processor 503 coupled to the bus 501 for processing information. The computer system 500 also includes main memory 505, such as random access memory (RAM) or other dynamic storage device, coupled to the bus 501 for storing information and instructions to be executed by the processor 503. Main memory 505 also can be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 6:
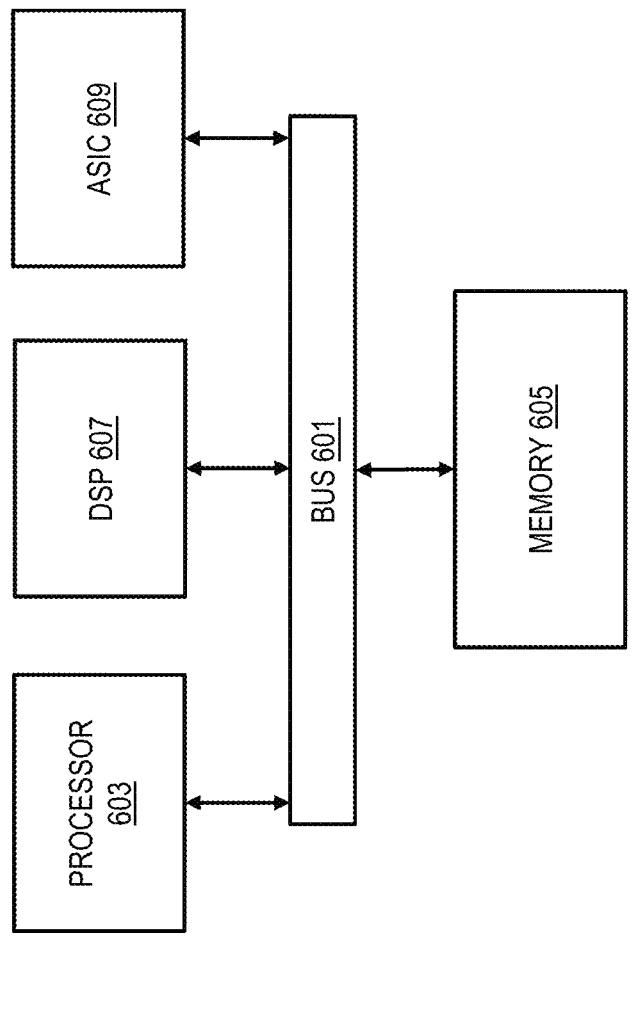
FIG. 6 is a diagram of a chip set that can be used to implement various exemplary embodiments.

FIG. 6 is a diagram of a chip set that can be used to implement various exemplary embodiments. FIG. 6 illustrates a chip set 600 upon which an embodiment of the invention may be implemented. Chip set 600 is programmed to provide a service over a communication session based on an authentication from a voice session and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of FIGS. 3A and 3B.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 6603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 605 also stores the data associated with or generated by the execution of the inventive steps.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining that a voice session is established among a plurality of devices;
   retrieving one or more authentication parameters associated with the voice session for the plurality of devices, wherein the one or more authentication parameters are determined based on subscriber identification information associated with the plurality of devices in the voice session;
   initiating a service among the plurality of devices, wherein the service is separate from the voice session;
   authenticating the plurality of devices for the service based on the one or more authentication parameters;
   establishing a communication session in parallel to the voice session based on the one or more authentication parameters; and
   providing the service over the communication session.

2. A method of claim 1, further comprising:
   continuing the service over the communication session following a termination of the voice session.

3. A method of claim 1, further comprising:
   determining one or more temporary accounts, one or more permanent accounts, or a combination thereof associated with the plurality of devices based on the one or more authentication parameters; and initiating the service based on the one or more temporary accounts, the one or more permanent accounts, or a combination thereof.

4. A method of claim 3, further comprising:
continuing the service over the communication session following a termination of the voice session.

5. A method of claim 1, further comprising:
presenting a user interface element for initiating the service within a user interface of the voice session.

6. A method of claim 1, wherein at least one of the plurality of devices is a service device associated with a provider of the service, the method further comprising:
presenting a service user interface for interacting with the service,
wherein the service user interface converts a user interaction into one or more service commands for transmission to the service device over the voice session.

7. A method of claim 1, wherein the service includes a messaging service, a game service, a video call service, an interactive voice response service, or a combination thereof.

8. A method of claim 1, wherein the one or more authentication parameters include a phone number, a subscriber identifier, a device identifier, a network identifier, an authentication key, a user identifier, or a combination thereof.

9. An apparatus comprising:
a processor; and
a memory including computer program code for one or more programs,
the memory and the computer program code configured to, with the processor, cause the apparatus to perform the following,
determine that a voice session is established among a plurality of devices;
retrieve one or more authentication parameters associated with the voice session for the plurality of devices, wherein the one or more authentication parameters are determined based on subscriber identification information associated with the plurality of devices in the voice session;
initiate a service among the plurality of devices, wherein the service is separate from the voice session;
authenticate the plurality of devices for the service based on the one or more authentication parameters;
establish a communication session in parallel to the voice session based on the one or more authentication parameters; and
provide the service over the communication session.

10. An apparatus of claim 9, wherein the apparatus is further caused to:
continue the service over the communication session following a termination of the voice session.

11. An apparatus of claim 9, wherein the apparatus is further caused to:
determine one or more temporary accounts, one or more permanent accounts, or a combination thereof associated with the plurality of devices based on the one or more authentication parameters; and
initiate the service based on the one or more temporary accounts, the one or more permanent accounts, or a combination thereof.

12. An apparatus of claim 11, further comprising:
continuing the service over the communication session following a termination of the voice session.

13. An apparatus of claim 9, wherein the apparatus is further caused to:
present a user interface element for initiating the service within a user interface of the voice session.

14. An apparatus of claim 9, wherein at least one of the plurality of devices is a service device associated with a provider of the service and the apparatus is further caused to:
present a service user interface for interacting with the service,
wherein the service user interface converts a user interaction into one or more service commands for transmission to the service device over the voice session.

15. An apparatus of claim 9, wherein the one or more authentication parameters include a phone number, a subscriber identifier, a device identifier, a network identifier, an authentication key, a user identifier, or a combination thereof.

16. A system comprising a voice session enhancement platform configured to:
determine that a voice session is established among a plurality of devices;
retrieve one or more authentication parameters associated with the voice session for the plurality of devices, wherein the one or more authentication parameters are determined based on subscriber identification information associated with the plurality of devices in the voice session;
initiate a service among the plurality of devices, wherein the service is separate from the voice session;
authenticate the plurality of devices for the service based on the one or more authentication parameters;
establish a communication session in parallel to the voice session based on the one or more authentication parameters; and
provide the service over the communication session.

17. A system of claim 16, wherein the voice session enhancement platform is further configured to:
continuing the service over the communication session following a termination of the voice session.

18. A system of claim 16, wherein the voice session enhancement platform is further configured to:
determine one or more temporary accounts, one or more permanent accounts, or a combination thereof associated with the plurality of devices based on the one or more authentication parameters; and
initiate the service based on the one or more temporary accounts, the one or more permanent accounts, or a combination thereof.

* * * * *